INVENTOR
D. W. HAGELBARGER
BY Lucian C. Canepa
ATTORNEY

INVENTOR
D. W. HAGELBARGER
BY Lucian C. Canepa
ATTORNEY

Sept. 4, 1962 D. W. HAGELBARGER 3,052,413

ACCUMULATOR

Filed March 11, 1959 6 Sheets-Sheet 3

INVENTOR
D. W. HAGELBARGER
BY Lucian C. Canepa
ATTORNEY

Sept. 4, 1962 D. W. HAGELBARGER 3,052,413

ACCUMULATOR

Filed March 11, 1959 6 Sheets-Sheet 4

INVENTOR
D. W. HAGELBARGER
BY Lucian C. Canepa
ATTORNEY

Sept. 4, 1962 D. W. HAGELBARGER 3,052,413

ACCUMULATOR

Filed March 11, 1959 6 Sheets-Sheet 5

INVENTOR
D. W. HAGELBARGER
BY Lucian C. Canepa
ATTORNEY

ACCUMULATOR

Filed March 11, 1959 6 Sheets-Sheet 6

INVENTOR
D. W. HAGELBARGER
BY Lucian C. Canepa
ATTORNEY 3,052,413
Patented Sept. 4, 1962

3,052,413

ACCUMULATOR

David W. Hagelbarger, Morris Township, Morris County, N.J., assignor to Bell Telephone Laboratories, Incorporated, New York, N.Y., a corporation of New York Filed Mar. 11, 1959, Ser. No. 798,773
8 Claims. (Cl. 235—176)

This invention relates to digital information processing circuits, and more particularly to high speed accumulator circuits including microwave elements.

In information processing systems it has been customary to represent binary information by the presence or absence of direct current pulses in successive time positions. This type of representation is reliable at relatively low frequencies, and systems, such as computers, have been built in which digital pulse repetition rates of four million per second have been satisfactorily handled. At higher digital pulse repetition rates, however, it is exceedingly difficult, using the techniques of the prior art, to build a reliable computer. This difficulty is cause in part by the lack of a pulse amplifier having sufficient bandwidth to amplify direct current pulses at these repetition rates, and, also, by the relatively slow speed of other conventional computer components.

A new approach for handling digital information at pulse repetition rates of about one hundred million per second is embodied in the circuits disclosed in W. M. Goodall Patent 2,914,249, issued November 24, 1959. The embodiments there disclosed are considered to represent a major breakthrough in the field of digital information processing circuits. In the noted Goodall patent, a series of binary digits are represented by a train in which each pulse is a burst of electromagnetic wave energy having a carrier frequency of from five to twelve kilomegacycles. Energy in this frequency range can be effectively amplified by distributed amplifiers, such as traveling wave tubes. Furthermore, microwave elements such as waveguide hybrid junctions are well suited for performing various switching functions in logic circuits handling bursts of high frequency electromagnetic wave energy at repetition rates of about one hundred million per second.

The desire to handle a maximum amount of information in a minimum amount of time has led to the development of microwave logic systems using increasingly high repetition rates. As, however, the pulse or burst repetition rates of logic circuits indicating microwave elements have been increased to values considerably above one hundred million per second, it has been found that the inherent delays of some of the microwave elements, for example, the traveling wave tubes, begin to approach a pulse interval or digit period. By a pulse internal is meant the elapsed time between corresponding points of successive positions or time slots, in which positions pulses of electromagnetic energy may or may not appear.

At a point at which the inherent delay of a microwave logic circuit element exceeds a pulse interval in time magnitude, is, of course, becomes impossible in a logic path including such an element to delay a pulse for only one pulse interval, thereby to make it available in an immediately next successive time slot.

Such availability is essential, for example, in a prior art accumulator circuit in which the algorithm of addition is performed. More specifically, in a circuit designed to add the binary words 011 and 001, whose decimal equivalents are respectively three and one, addition of the least significant digits (i.e., for the specific case here, the right-hand or first one of each of the words) gives in the first time slot a partial sum of "0" and a first carry of "1," which first carry of "1" should be available in the second or next more significant time slot ot be added to "1" and "0," thereby to produce another "0" and a second carry of "1," which second carry of "1" should then be available in the next successive or third time slot to be added to "0" and a "0" to give a final sum of 100, whose decimal equivalent, of course, is four.

Thus, in certain high speed microwave logic circuits it appeared that the inherent time delays of the elements thereof would limit the repetition rates, and, thus, the speed, at which information could be processed thereby.

An object of the present invention is an improved microwave logic circuit.

Another object of this invention is to increase the speed of operation of microwave logic circuits.

More specifically, an object of this invention is a microwave accumulator whose information handling speed is not directly limited by the inherent delays possessed by the microwave elements thereof.

These and other objects of the present invention are realized in a specific illustrative embodiment thereof which comprises traveling wave tubes and waveguide hybrid junctions including asymmetrically conducting devices, the junctions functioning as AND and EXCLUSIVE-OR circuits, and the junctions and the traveling wave amplifiers being interconnected by sections of waveguide. The configuration is arranged to function as a high speed accumulator which is capable of processing serially-presented partial products at a pulse repetition rate of one hundred and sixty million per second, and higher.

Typical traveling wave tubes of the type included in illustrative embodiments of this invention delay pulses amplified thereby by about seven millimicroseconds, that is, an amplified counterpart of an input pulse appears at the output of a typical traveling wave tube about seven millimicroseconds after the occurrence of the pulse at the input. Delays of this magnitude would normally dictate against operation of an accumulator at pulse repetition rates of one hundred and sixty million per second, for the pulse interval corresponding to such a rate is about 6.7 millimicroseconds, a magnitude less than that of the noted delays.

One specific high speed accumulator illustratively embodying the principles of this invention includes first and second microwave logic stages, each of which includes an AND circuit and an EXCLUSIVE-OR circuit, and between which stages there are connected intermediate sum, first carry, second carry and output paths. Each of these, except the second carry path, includes a traveling wave tube which introduces a delay greater than a pulse interval. The proper timing of carries in an arrangement of this type is maintained by selectively adding a delay to each of the four paths.

The added delays make it impossible to have second carry signals available for use in the same accumulator cycle in which they are generated. Accordingly, the delays are arranged such that a second carry is selectively delayed for insertion into a proper time position in the next immediately following accumulator cycle. To obtain an output or answer in an accumulator embodying this novel concept requires more pulse intervals than is required in a straightforward accumulator whose pulse repetition rate is directly limited by the inherent delays in the circuit. However, an accumulator illustratively embodying the principles of this invention may be operated at pulse repetition rates corresponding to pulse intervals which are considerably less than the inherent delays of the circuit. Therefore, in accordance with this novel concept, the true or total time involved in obtaining an answer is less.

One feature of the present invention is the improvement of an accumulator circuit having inherent interstage delays comparable in magnitude with, or greater than, the digit interval corresponding to a high pulse repetition rate, by selectively adding interstage delays thereto, such that signals which are not retrievable in time to be inserted in their usual time positions are selectively delayed until a later time, whereby the circuit may then be operated at higher-than-normal pulse repetition rates, thereby to be capable of processing information at extremely high speeds.

Another feature of this invention is the selective addition of delay to each of the inherent interstage delays of an accumulator circuit, such that second carry signals are only available in the circuit for insertion in proper time positions in the accumulator cycle immediately next following the one in which the carries are generated.

Still another feature of the present invention is a microwave logic accumulator for operation at pulse repetition rates corresponding to digit intervals which are less than the inherent delays of the microwave elements thereof including a stage to which are coupled input and carry signals, the time relationship between the input and carry signals being either advanced or delayed by selective adjustment of the delays in each of the input and carry paths.

A further feature of this invention is a microwave logic accumulator capable of operation at very high pulse repetition rates including first and second carry paths each of which includes a delay greater than a pulse interval, the delays being selected so that first and second carries are available in the accumulator in respectively different cycles.

Another feature of the present invention is an accumulator comprising a first stage for generating intermediate sum and first carry signals, a second stage for generating second carry signals, a directional coupler, a first signal path coupling the intermediate sum signals to the second stage, a second signal path coupling the second carry signals to the directional coupler, a third signal path extending between the first stage and the directional coupler, a fourth signal path interconnecting the directional coupler and the second stage, and a fifth signal path interconnecting the first and second stages, each of the first, second, fourth and fifth paths including a delay unit, the delay units being so proportioned that signals generated by the second stage are returned thereto in an accumulator cycle next following the one in which they are generated.

Thus, in accordance with the principles of the present invention, information may be processed at extremely high speeds by microwave logic circuits which are capable of operation at higher pulse repetition rates than heretofore considered possible.

A complete understanding of the present invention and of the above and other features thereof may be gained from a consideration of the following detailed description and the accompanying drawing, in which.

Figure 1:
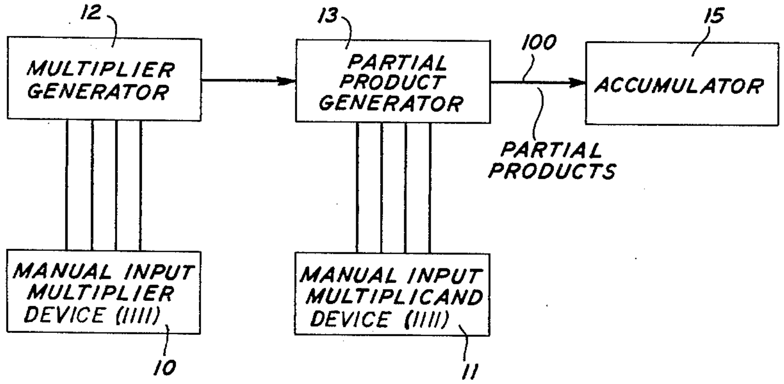
FIG. 1 is a block diagram of a digital multiplier including an accumulator.

Referring to FIG. 1, there is shown a system capable of multiplying two binary words. The system includes a manual input multiplier device 10, a manual input multiplicand device 11, a multiplier generator 12, and a partial product generator 13. These circuits cooperate to form serially-presented partial products, which are coupled by means of a path 100 to an accumulator 15.

The circuits included in the blocks 10, 11, 12 and 13 may easily be implemented by a worker skilled in the art of pulse-forming techniques. One exemplary implementation includes manual switches in each of the blocks 10 and 11, by means of which multiplicand and multiplier digital information is fed into the system. Then, for example, binary signals representing the multiplier are coupled in parallel to the multiplier generator 12, where they are converted to serial form. These signals are coupled to the partial product generator 13, to which are fed in parallel binary signals representing the multiplicand. The generator 13 is arranged such that it serially produces, in response to each multiplier 1 pulse applied thereto, the digits of the multiplicand. These digits or partial products are, in turn, coupled to the block 15, where by the process of accumulation an answer or product is formed.

Figure 2A:
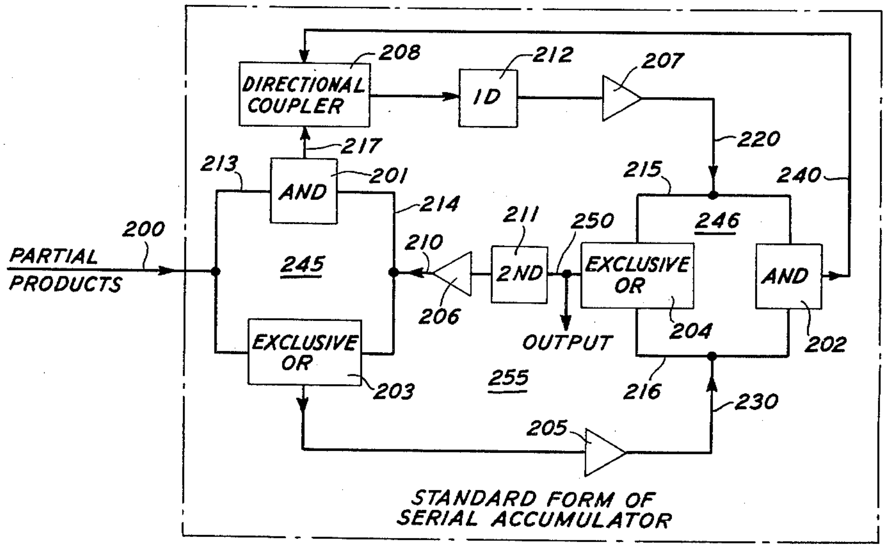
FIG. 2A is a block diagram of a standard form of serial accumulator.
Figure 2B:
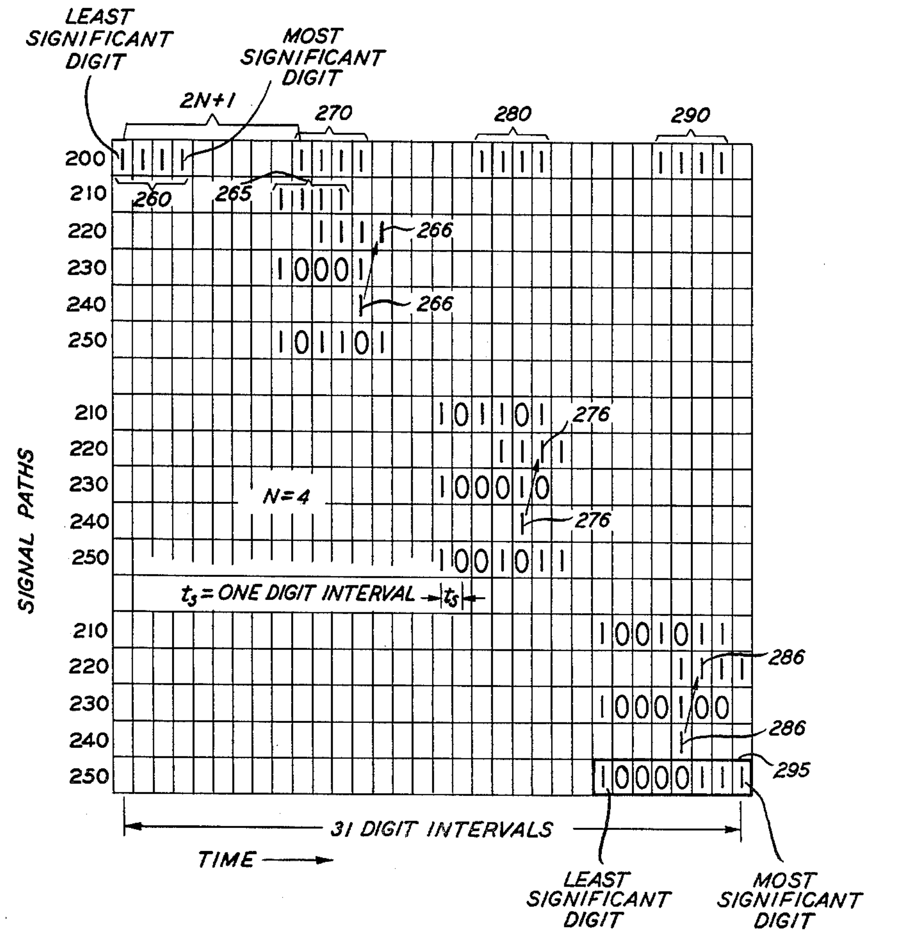
FIG. 2B is a timing diagram illustrating the mode of operation of the accumulator of FIG. 2A.

Illustrative, the multiplier generator 12 and the partial product generator 13 of FIG. 1 may each be of the parallel-to-serial converter shown in FIG. 13–2*b* on page 268 of "High-Speed Computing Devices," by the staff of Engineering Research Associates, Inc., McGraw-Hill, 1950.

Emphasis hereinafter will only be directed to the accumulator portion 15 of the multiplier shown in FIG. 1, for this invention is neither limited by nor dependent on any particular means for forming pulses representing partial products. Indeed, any circuits capable of supplying properly-spaced serially-presented partial products in binary form, characterized by a pulse repetition rate of about one hundred and sixty million per second, may be combined with an accumulator illustratively embodying the principles of this invention, thereby to form a system capable of performing multiplication.

In the interests of simplicity and clarity of presentation, the specific descriptions herein of both the standard form of serial accumulator, shown in FIG. 2A, and of the accumulators illustratively embodying the principles of this invention, will relate to the mode of operation of an accumulator to which are coupled partial products corresponding to a multiplier and a multiplicand each having the binary form "1111." This is indicated in each of the blocks 10 and 11 of FIG. 1 by the word "1111" which appears in parentheses therein.

Each of the accumulators shown in FIGS. 2A, 3A and 4A will be described in functional terms, with the aid, respectively, of the timing diagrams of FIGS. 2B, 3B and 4B, and then the specific illustrative implementation shown in FIG. 5 will be described.

The basic circuits or blocks out of which the accumulators described herein are built include the AND unit, which produces an output signal only when all of the input paths thereto are energized; the EXCLUSIVE-OR unit, which produces an output signal if one but not both of its input paths is energized; and delay units having delays equal to various numbers of digit periods. Delay units are depicted in the drawing by logic blocks having therein the letter "D" preceded by a number indicating the number of digit periods of delay provided by the delay unit and the other components serially connected therewith. In other words, it will be assumed for our purposes here that all of the delay of a signal path is lumped in one delay unit, although each delay block in fact introduces only enough delay to make the total of its delay and that of the other components of the signal path in which it is placed equal to a predetermined value.

Also, each of the accumulators described herein includes one or more directional couplers having, for example, three terminals, characterized in that a transfer of energy without reflection may take place from the first to the third terminal thereof, but no transfer of energy can take place from the first to the second terminal. Similarly, energy may be transferred from the second to the third terminal without reflection, but not so from the second to the first terminal.

Turning now to FIG. 2A, there is depicted an accumulator 255 designed for operation at a pulse repetition rate whose pulse interval is sufficiently greater in time magnitude than the interstage delays introduced by the components of the accumulator that a carry signal is available in a time position immediately following the one in which the carry is generated. The accumulator includes AND circuits 201 and 202, EXCLUSIVE-OR circuits 203 and 204, pulse amplifiers 205, 206 and 207, a directional coupler 208, and delay units 211 and 212, all of which are interconnected by means of a plurality of pulse or signal paths 200, 210, 213 through 217, 220, 230, 240 and 250, in the specific manner shown in FIG. 2A.

Appearing on the signal path 200 of the accumulator of FIG. 2A are properly-spaced digital signals representing partial products. The partial product spacing for which the accumulator of FIG. 2A is designed is 2 N+1 digit periods, where N is the number of digits per partial product. N equals four in the specific examples to be considered herein.

Referring now to FIG. 2B, there is depicted, as a function of time, in diagrammatic form, the presence or absence of pulses on selected ones of the signal paths of the accumulator of FIG. 2A. The presence of a pulse in a given time slot or position is represented by the digit "1" therein, and the absence of a pulse in a given time slot is represented by a "0," or no mark at all, in that slot.

If a pulse does in fact appear in a given time slot or position, the pulse may, illustratively, be considered to occur exactly in the center of the time slot, the width of the pulse being typically about one-half the width of a time slot.

The first partial product 260 appears, least significant digit first, on the signal path 200 at one input of a first stage 245 comprising the units 201 and 203, travels through the EXCLUSIVE-OR circuit 203, along the sum path 230, through the EXCLUSIVE-OR circuit 204 of a second stage 246 comprising the units 202 and 204, and, after a delay of 2 N or eight digit intervals, introduced by the unit 211, appears on the path 210 at the other input to the stage 245. Reference numeral 265 in the diagram of FIG. 2B identifies the first partial product as it appears on the path 210 in proper time position to be combined with the second partial product 270 which, in the manner characteristic of all the partial products coupled to the input path 200, appears with its least significant digit first in time.

The coincidence in time of some of the pulses of the second partial product 270 and the first partial product 265 results in the AND circuit 201 transferring an output to the signal path 217, through the directional coupler 208 and the one digit period delay unit 212, and to the first carry path 220, which is coupled to one of the inputs of the stage 246. Meanwhile, the second partial product 270 and the time-shifted first partial product 265 are applied as inputs to the EXCLUSIVE-OR circuit 203 which, as a result thereof, supplies the word "10001" via the signal path 230 to the other input to the stage 246. In turn, the pulses forming the word "10001" combine with the pulses appearing on the first carry path 220 to provide a second carry signal 266, which is directed by the directional coupler 208 through the delay unit 212, to appear on the first carry path 220 in a time position immediately following the last one of the first carry pulses generated by the AND unit 201.

At this point it will be helpful to define an accumulator cycle. Such a cycle is hereby defined as a time period which is one digit interval less than the partial product spacing. For example, in the diagram of FIG. 2B, wherein the partial product spacing is 2 $N+1$, an accumulator cycle extends over 2 N digit intervals. Thus, it is seen from FIG. 2B that the second carry signal 266 is both generated by and reinserted into the stage 246 during a single accumulator cycle.

Note that the partial product spacing 2 $N+1$ is depicted in FIG. 2B as extending from midpoint-to-midpoint of the first time positions of two adjacent partial products. This same midpoint-to-midpoint mode of depiction is also employed in each of FIGS. 3B and 4B.

With the aid of FIG. 2B, the complete operation of the accumulator of FIG. 2A may be easily followed along in a manner similar to that described above. The complete operation results in the generation of other second carry signals, namely, 276 and 286, each of which is both produced by and reinserted into the stage 246 during a single accumulator cycle.

Furthermore, it is noted that the reinsertion of each of the second carry signals 266, 276 and 286 occurs in a time position immediately following that in which the signal is generated. Also, the mode of operation of the accumulator of FIG. 2A depends on first carry signals, which are produced by the AND unit 201, being respectively available in time positions immediately following the ones in which the unit 201 produces them.

The accumulator of FIG. 2A is capable of serially presenting, least significant digit first, on the output path 250 within thirty-one digit intervals, the total accumulation of the four partial products presented to it, one digit interval being identified in FIG. 2B by the symbol $t_s$. Thus, the total time required to obtain an answer 295 on the output path 250 with such an accumulator is 31 $t_s$.

As, however, the pulse repetition rate of the partial products presented to the accumulator shown in FIG. 2A is increased, in an attempt to decrease the time required in which to obtain an answer therefrom, a point is reached at which the inherent delays of the various units of the accumulator, particularly the amplifiers 205, 206 and 207, make it impossible to retrieve first and second carry signals quickly enough to conform to the mode of operation described above. Accordingly, these inherent delays impose a direct limitation on the speed of operation of a standard form of accumulator.

Figure 3A:
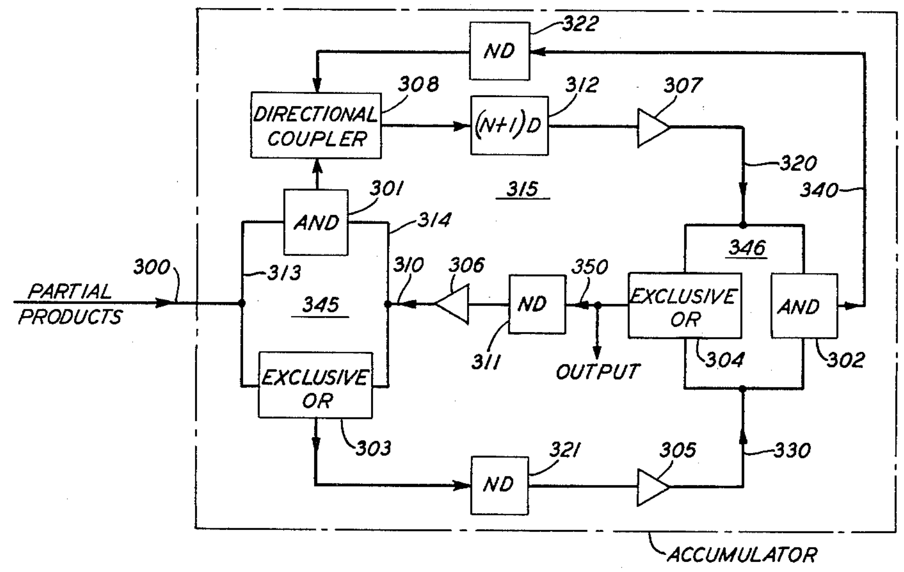
FIG. 3A is a block diagram of a serial microwave accumulator made in accordance with the principles of the present invention.

One specific accumulator illustratively embodying the principles of the present invention is shown in FIG. 3A. The accumulator 315 there shown includes units, namely, AND circuits 301 and 302, EXCLUSIVE-OR circuits 303 and 304, a directional coupler 308, and amplifiers 305, 306 and 307, which are similar in form and identical in function to the units occupying corresponding positions in the block diagram of FIG. 2A. The delay units 321 and 322 of the circuit of FIG. 3A, however, have no counterparts in the accumulator shown in FIG. 2A. And, furthermore, the delay units 311 and 312 are structurally different from the corresponding units in FIG. 2A, viz., the blocks 211 and 212. The delay units 311, 312, 321 and 322 are so interrelated that the mode of operation of accumulator 315 of FIG. 3A is basically unlike that described above in connection with FIG. 2A.

Figure 3B:
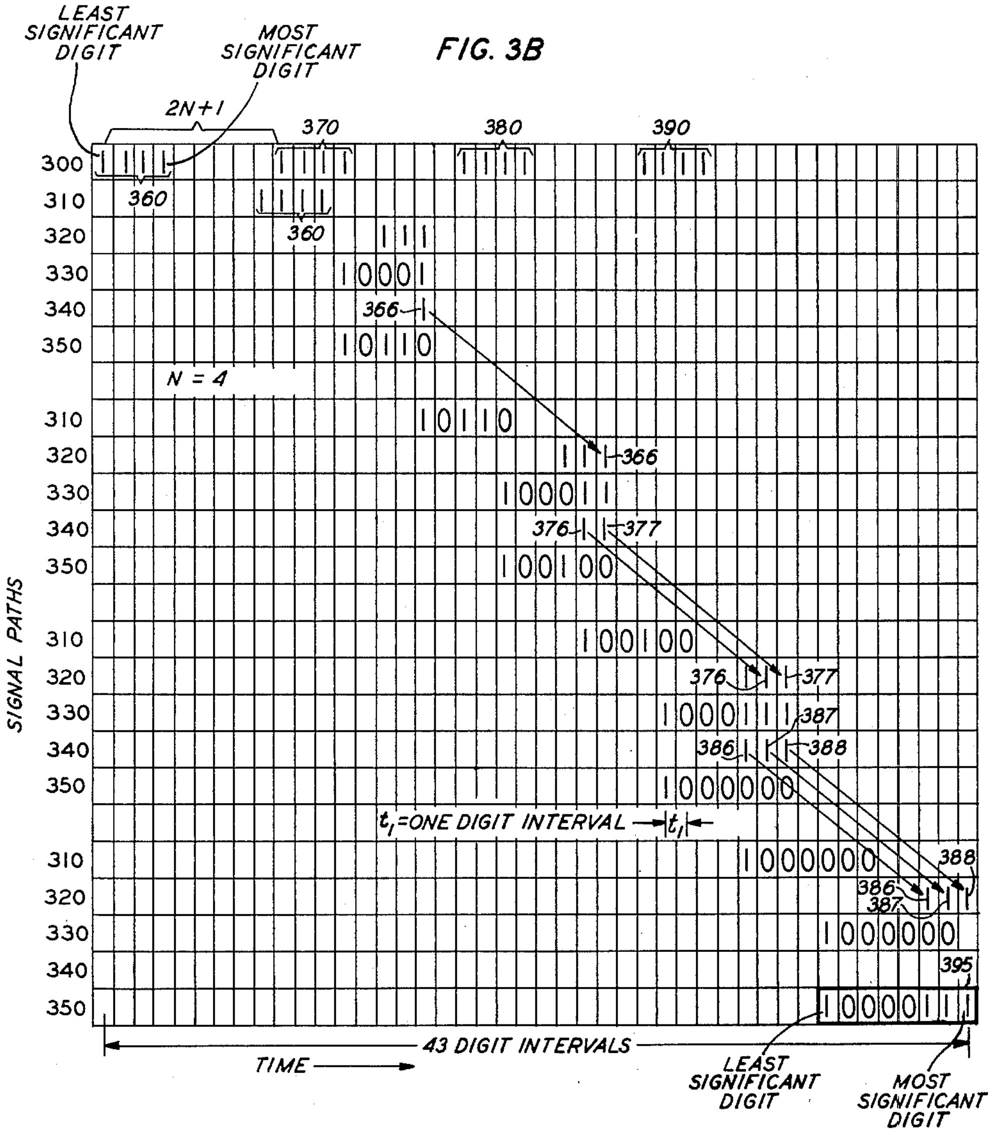
FIG. 3B is a timing diagram illustrating the mode of operation of the novel accumulator of FIG. 3A.

FIG. 3B indicates the manner in which partial products 360, 370, 380 and 390, serially presented, least significant digit first, on the path 300 with a spacing of 2 $N+1$, are combined in the novel accumulator of FIG. 3A. The processing of the partial products 360 and 370 by the stage 346 forms a second carry signal 366, which is delayed by the units 322 and 312 so as to be fed back to the stage 346 in the next following accumulator cycle.

Similarly, the application of the partial product 380 to the accumulator 315 results in the formation of second carry signals 376 and 377, which, as indicated in FIG. 3B, are delayed until the next following accumulator cycle. And, finally, the application of the partial product 390 to the accumulator 315 results in the formation by the stage 346 of second carry signals 386, 387 and 388, each of which is delayed by the units 322 and 312 so as to be reinserted in the stage 346 during an accumulator cycle next following the one in which it is generated.

The above-described mode of operation of the accumulator of FIG. 3A produces on the output path 350 thereof a final answer or product 395 within forty-three digit intervals, as contrasted with thirty-one digit intervals for the standard accumulator shown in FIG. 2A. However, the shortest tolerable interstage delay in the arrangement of FIG. 3A, for the case of $N=4$, is four digit or pulse intervals. Thus, assuming that the longest unavoidable inherent interstage delay introduced by the components of the accumulator is $x$ seconds, the pulse repetition rate of the partial products coupled to the accumulator of FIG. 3A may be increased to a point where the corresponding pulse interval is less than $x$ seconds. More specifically, the pulse interval may be decreased to a point where it approaches one-quarter of $x$. In other words, the pulse rate handling capability of one specific accumulator made in accordance with the principles of the present invention is increased by about a factor of four over that of a standard accumulator. Accordingly, the digit interval in such an accumulator may be about one-quarter of $t_s$. Therefore, the total or true time required to obtain an answer therein is approximately $$\frac{43\ t_s}{4}$$

or only about one-third of the time required by the standard accumulator of FIG. 2A.

The interposition of additional delay in the various paths of an accumulator, in accordance with the principles of this invention raises the possibility of reversing the order of the digits in the multiplier or multiplicand, or both, and of advancing rather than delaying the carries. Specifically, the arrangements listed in Table I below are feasible.

*Table I*

| | Carries | Highest Order of Multiplicand and Product | Highest Order of Multiplier |
|---|---|---|---|
| 1 | Delayed | Last | Last. |
| 2 | Delayed | Last | First. |
| 3 | Advanced | First | Last. |
| 4 | Advanced | First | First. |

Arrangement No. 1 is the one embodied both in the standard accumulator shown in FIG. 2A and in the novel accumulator of FIG. 3A.

Arrangement No. 2 may be implemented by a configuration which is identical in form to that shown in FIG. 3A. It is noted, however, that the spacing of the partial products applied to such an implementation of arrangement No. 2 should advantageously be $2\ N-1$.

Figure 4A:
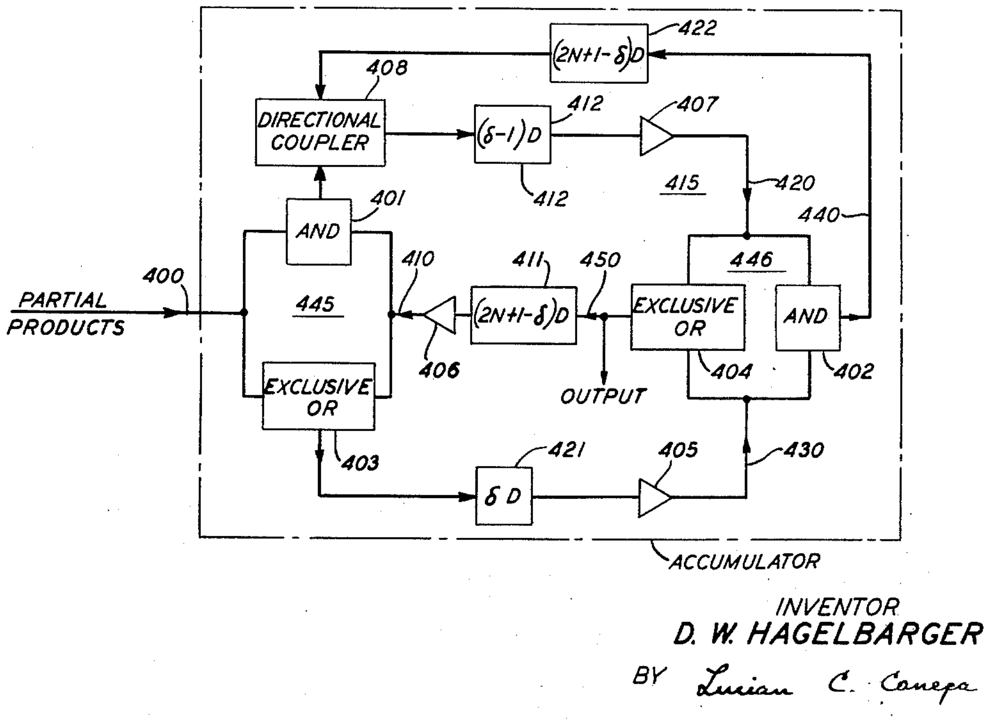
FIG. 4A is a block diagram of another serial microwave accumulator made in accordance with the principles of this invention.

Arrangement No. 3, which involves advancing rather than delaying carries, is embodied in the novel accumulator 415 of FIG. 4A. That configuration includes a first stage 445 comprising an AND unit 401 and an EXCLUSIVE-OR unit 403, a second stage 446 comprising and AND unit 402 and an EXCLUSIVE-OR circuit 404, a directional coupler 408, amplifiers 405, 406 and 407, and delay units 411, 412, 421 and 422.

Included in each of the delay units 411, 412, 421 and 422 of the accumulator shown in FIG. 4A is the symbol $\delta$, which represents any integer above two and less than $2\ N+2$. Illustratively, the mode of operation of the configuration of FIG. 4A will be described hereinbelow for the case where $\delta$ equal five.

It is noted that the simultaneous occurrence of a pulse on each of the signal paths 400 and 410 results in the circuit 403 coupling a "0" to the intermediate sum path 430, and in the circuit 401 coupling a "1" to the carry path 420. Comparing the delay introduced by the unit 412 of FIG. 4A with that introduced by the unit 421, it is seen that the carry signal arrives at the stage 446 in advance of the intermediate sum signal. This is illustrative of what is meant herein by an advanced carry arrangement.

Figure 4B:
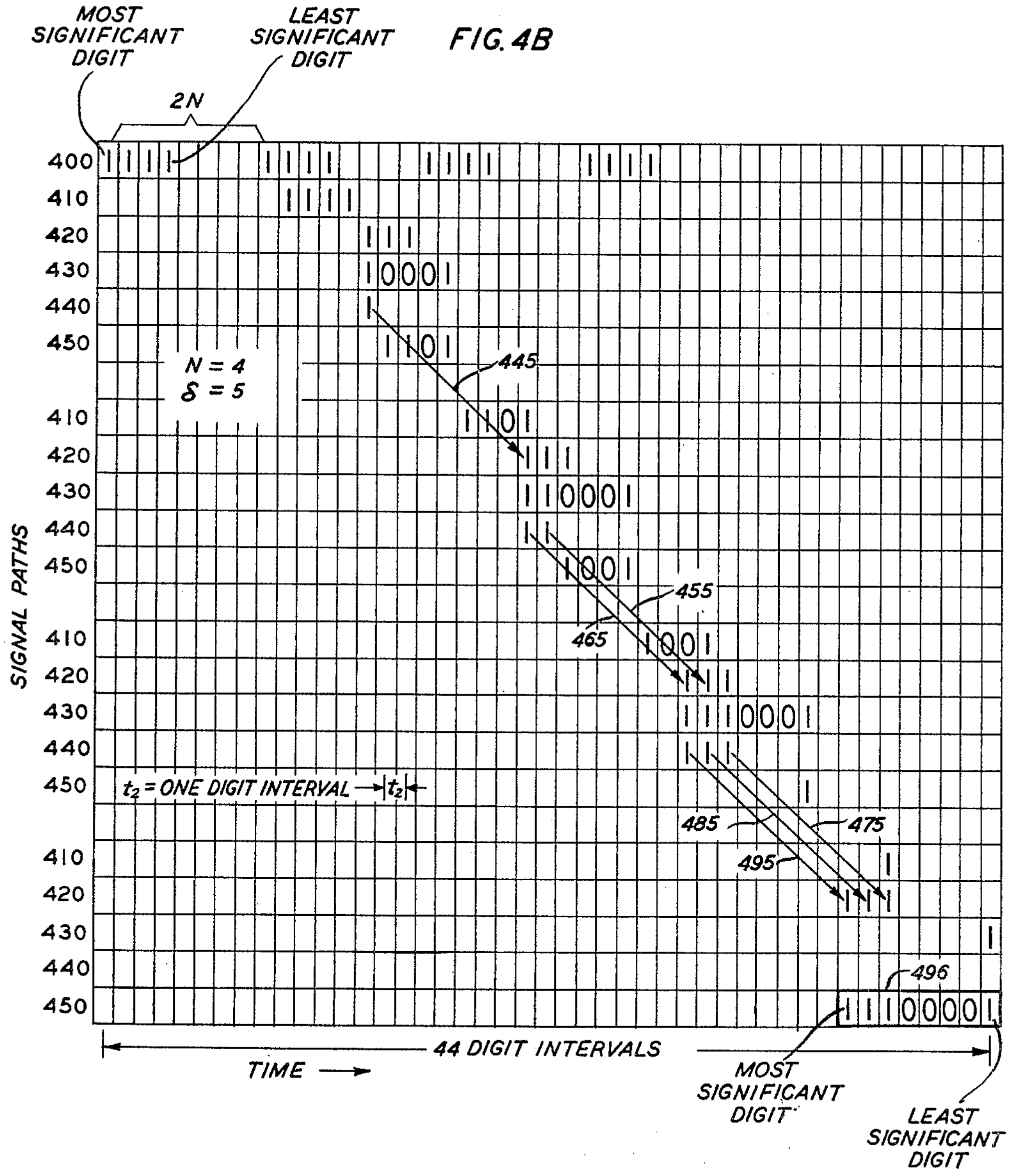
FIG. 4B is a timing diagram illustrating the mode of operation of the novel accumulator of FIG. 4A.

Referring now to FIG. 4B, there is represented the mode of operation of the novel accumulator of FIG. 4A. Note that the spacing of the partial products coupled to that accumulator is 2 N. Therefore, the accumulator cycle for such an accumulator will be defined as a time period extending over $2\ N-1$ digit intervals.

Each second carry generated in the configuration of FIG. 4A is reinserted into the generating stage 446 after a delay of an accumulator cycle. This is indicated in FIG. 4B by the arrows 445, 455, 465, 475, 485 and 495.

A final answer 496 is available on the output signal path 450 of FIG. 4A after forty-four digit intervals, which, in terms of true time relative to the digit interval of the standard accumulator of FIG. 2A, is approximately $$\frac{44\ t_s}{4}$$

in view of the fact that the shortest tolerable interstage delay in FIG. 4A is four digit intervals.

It is to be noted that the accumulator shown in FIG. 4A may be arranged to operate slightly faster. This alternative arrangement is identical in form to the system shown in FIG. 4A except that the digit periods of delay introduced by the units 411, 412 and 422 are changed to the values $2\ N-\delta$, $\delta-1$ and $2\ N-\delta$, respectively. The spacing of the partial products coupled to such an alternative arrangement should be $2\ N-1$.

Arrangement No. 4 of Table I may be implemented by a configuration which is identical in form to that shown in FIG. 4A. It is noted, however, that the spacing of the partial products applied to such an implementation should be $2\ N+2$.

Figure 5:
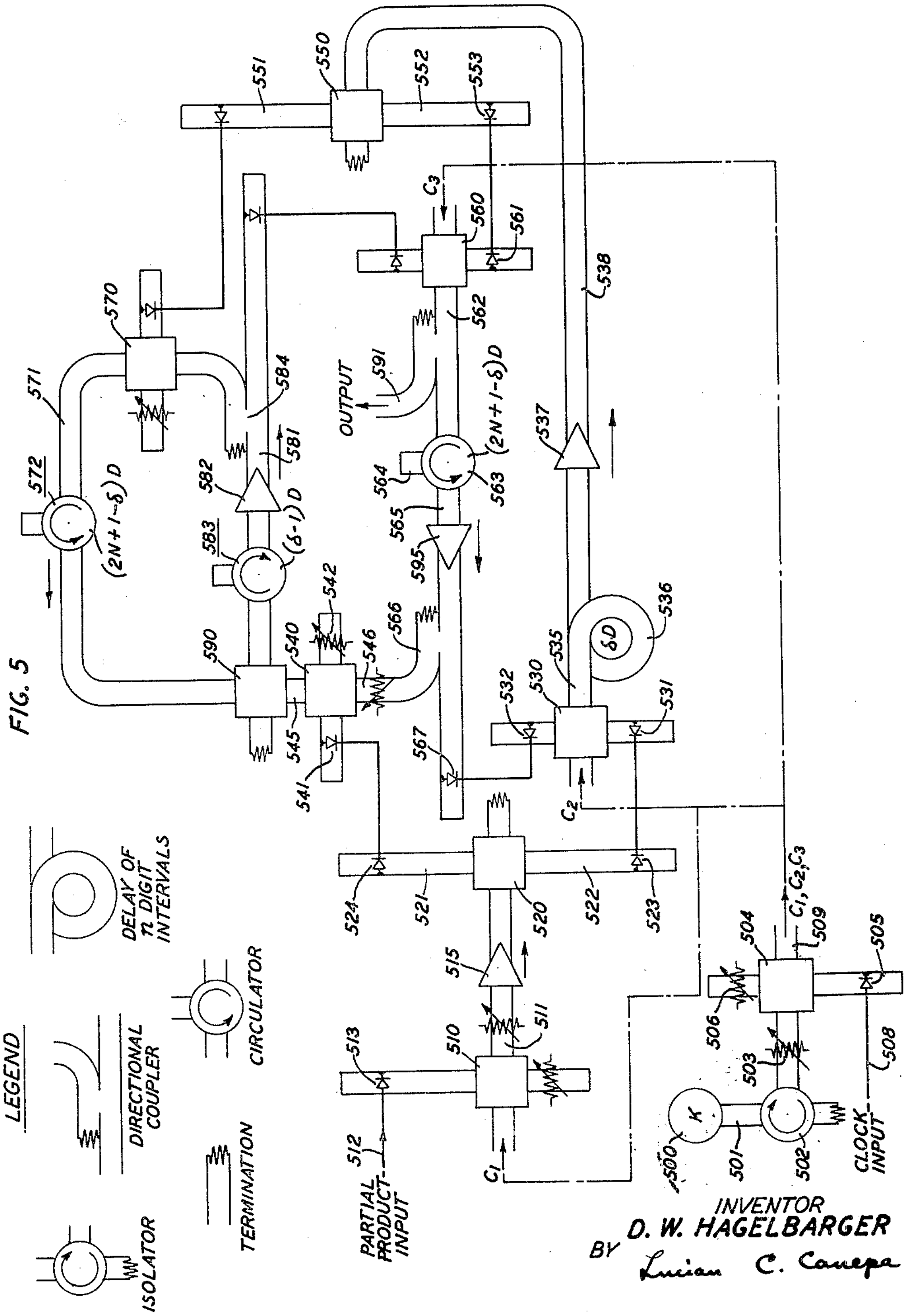
FIG. 5 depicts an illustrative implementation of the block diagram of FIG. 4A.

Referring now to FIG. 5, there is shown a specific illustrative microwave implementation of the accumulator shown in block diagram form in FIG. 4A. The microwave components out of which the illustrative implementation is constructed are well known to workers in the microwave field. Also, the aforementioned Goodall patent contains a complete description of such components.

The microwave configuration includes a klystron oscillator 500 whose output is coupled by a waveguide section 501 to an isolator element 502. The output of the isolator 502 is coupled through a variable microwave attenuator element 503 to the input arm of a waveguide hybrid junction 504, in a side arm of which an asymmetrically conducting device 505, such as a crystal rectifier, is positioned. In the other side arm of the hybrid 504, there is located a variable microwave attenuator element 506 by means of which the impedances of the two side arms may be made equal in the absence of CLOCK INPUT pulses on lead 508. Under such conditions microwave energy applied to the input arm of the hybrid 504 does not appear on the output arm 509 thereof. If, however, the impedance condition of the device 505 is changed from that of the element 506 by, for example, the application to the device 505 of CLOCK INPUT biasing pulses at a repetition rate of one hundred and sixty million per second, a portion of the energy coupled to the input of the hybrid junction 504 will appear on the output arm 509 at a burst repetition rate of one hundred and sixty million per second, and will be applied to the circuit points marked $C_1$, $C_2$ and $C_3$ by sections of connecting waveguide (not shown).

Another waveguide hybrid junction 510 operates in essentially the same manner as the junction 504, thereby to provide a microwave output on an arm 511 whenever a PARTIAL PRODUCT INPUT pulse is applied on lead 512 to a rectifier 513. Thus, for each pulse applied to the device 513, a burst of microwave energy appears at the output of the junction 510.

The output of the junction 510 of the configuration of FIG. 5 is amplified by the element 515, which may, for example, be a traveling wave tube. The amplified output is then coupled to another hybrid junction 520, each of whose side arms 521 and 522 contains a rectifier device. These devices 523 and 524 serve respectively as biasing sources for the rectifiers 531 and 541 of hybrid junctions 530 and 540.

The coupling of a burst of microwave energy corresponding to a partial product signal to the junction 520 results in the application of a portion of that energy to each of the devices 523 and 524, which devices then respectively unbalance the impedance match established in the junction 530 between the device 531 and another side arm rectifier 532, and in the junction 540 between the device 541 and an attenuator element 542. Thus, a portion of the microwave signal $C_2$ applied to the junction 530 appears on the output arm 535, is transmitted through a looped section of waveguide 536, which is selected to introduce a delay of δD digit intervals, passes through an amplifier 537, is coupled by a waveguide path 538 (which corresponds to the intermediate sum path 430 of FIG. 4A) to the input arm of a junction 550, and then splits equally to the side arms 551 and 552 thereof. In this manner, a rectifier 553 in the side arm 552 of the junction 550 applies an unbalancing bias to a rectifier 561 of another junction 560, thereby to enable a portion of the microwave signal $C_3$ to appear on the output arm 562 of the junction 560. A portion of this output is transmitted to a circulator element 563, is transferred in a counterclockwise direction to a waveguide stub 564, is reflected back to the circulator 563 and again transferred in a counterclockwise direction to a waveguide section 565. The delay introduced by the circulator 563 and the waveguide stub 564 is designed to be $2N+1-\delta$ digit intervals.

The output of the circulator 563 passes through an amplifier 595 and is then split by a directional coupler 566, one part of the energy being transmitted to the junction 540 and another part to a rectifier 567. The rectifier 567 in turn, is the biasing source for the side arm device 532 of the junction 530.

The junction 530 functions as an EXCLUSIVE-OR circuit, providing an output only if one, but not both, of the devices 531 and 532 therein is biased to an other-than-normal condition by the energization of the devices 523 and 567, respectively.

The junction 540 functions as an AND circuit, providing an output on arm 545 if the device 541 is biased by the device 524 to an other-than-normal condition and if energy is coupled to the input 546 of the junction 540 by the directional coupler 566.

Similarly, in accordance with the principles and explanation given above, it may be seen that the junction 560 is an EXCLUSIVE-OR circuit and that junction 570, which is coupled to the junction 550, functions as an AND circuit.

The accumulator of FIG. 5 includes a second carry path 571 in which is positioned a unit 572 which introduces a delay of $2N+1-\delta$ digit intervals. The accumulator further includes a first carry path 581 in which an amplifier 582 and a $\delta-1$ digit delay unit 583 are located. Also, the accumulator comprises a junction 590, which functions as a four-terminal directional coupler, and a directional coupler 584 having three terminals.

It is noted that FIG. 5 includes an arrow parallel and adjacent to each of the main signal paths thereof. These arrows indicate the direction of microwave energy propagation in the novel accumulator of FIG. 5.

Output signals may be derived from the accumulator of FIG. 5 by means of a directional coupler 591. The output signals may advantageously be gated out from the coupler 591 by an arrangement embodying the concepts of the invention disclosed in a copending application of G. A. Backman and W. C. G. Ortel, Serial No. 807,852, filed on April 21, 1959, now Patent No. 3,018,048, issued January 23, 1962, thereby to enable a novel accumulator made in accordance with the principles of this invention to process digital information in even less time than described herein.

It is to be understood that the above-described arrangements are only illustrative of the application of the principles of the present invention. Numerous other arrangements may be devised by those skilled in the art without departing from the spirit and scope of the invention. For example, a microwave accumulator similar in form to that of FIG. 5 may be easily constructed in view of the disclosure above to embody each of the arrangements specified in Table I.

Furthermore, it is to be noted that the novel concepts of this invention may be easily embodied in systems designed to add, subtract or divide, as well as to multiply.

What is claimed is:

1. An accumulator comprising first generating means for generating intermediate sum and first carry signals, second generating means for generating second carry signals, directional coupler means, first coupling means coupling said intermediate sum signals to said second means, second coupling means coupling said second carry signals to said directional coupler means, carry signal path means extending between said first generating means and said directional coupler means for coupling said first carry signals to said directional coupler, means for propagating first and second carry signals interconnecting said directional coupler means and said second generating means, and means interconnecting said first and second generating means, each of said first coupling, second coupling, propagating, and interconnecting means including delay means, which delay means are so proportioned that signals generated by said second generating means are returned thereto in an accumulator cycle next following the one in which they are generated.

2. An accumulator as in claim 1 wherein the delay means associated with said first coupling, second coupling, propagating, and interconnecting means introduce delays of N, N, $N+1$, and N digit periods, respectively.

3. An accumulator as in claim 1 wherein the delay means associated with said first coupling, second coupling, propagating, and interconnecting means introduce delays of $\delta$, $2N+1-\delta$, $\delta-1$, and $2N+1-\delta$ digit periods, respectively.

4. An accumulator as in claim 1 wherein the delay means associated with said first coupling, second coupling, propagating, and interconnecting means introduce delays of $\delta$, $2N-\delta$, $\delta-1$, and $2N-\delta$ digit periods, respectively.

5. In combination in an accumulator, means for generating intermediate sum signals, means for generating first carry signals, means for generating second carry signals, first means coupling said intermediate sum signals to said second carry generating means, second means coupling said first carry signals to said second carry generating means, and closed path means, including a portion of said second means, coupling said second carry signals back to said second carry generating means, each of said coupling means and closed path means including means for introducing a delay of more than one digit period to signals propagated therethrough, said delay means being so proportioned that second carry signals are coupled back to said second carry generating means in an accumulator cycle next following the one in which they are generated.

6. In combination in a high speed accumulator, means for forming intermediate sum and first carry signals, means for forming second carry signals, means coupling said intermediate sum signals to said second carry-forming means, means coupling said first carry signals to said second carry-forming means, and closed path means coupling said second carry signals back to said second carry-forming means, each of said coupling means and closed path means including means for introducing a delay of more than one digit period to signals propagated therethrough, said delay means being so proportioned that second carry signals are coupled back to said second carry-forming means one accumulator cycle after being generated by said second carry-forming means.

7. In combination in a high speed accumulator, means for forming intermediate sum and first carry signals, means for forming second carry signals, means for coupling said intermediate sum signals to said second carry-forming means, means for coupling said first carry signals to said second carry-forming means, and closed path means, including a portion of said first carry-coupling means, coupling said second carry signals back to said second carry-forming means, each of said coupling means and closed path means including means for introducing a delay of more than one digit period to signals propagated therethrough, said delay means being proportioned so that first and second carry signals are available in the accumulator in respectively different cycles.

8. In a microwave accumulator capable of processing digital information whose digit intervals are sufficiently small that the inherent interstage delays of the accumulator make it impossible to retrieve carry signals within one digit interval of their generation, means for generating carry signals in one accumulator cycle, and signal path means, including means for introducing a delay of more than one digit period to signals propagated therethrough, for coupling said carry signals back to said generating means in a next following accumulator cycle.

References Cited in the file of this patent

UNITED STATES PATENTS

| | | |
|---|---|---|
| 2,888,651 | Brandon et al. | May 26, 1959 |
| 2,914,249 | Goodall | Nov. 24, 1959 |

OTHER REFERENCES

Williams et al.: Universal High-Speed Digital Computers: Serial Computing Circuits, Proceeding of the Institute of Electrical Engineers, part II (April 1952), pages 114 and 115 relied on.